United States Patent [19]

Kozerski

[11] Patent Number: 4,480,844
[45] Date of Patent: Nov. 6, 1984

[54] CYLINDER HEAD GASKET WITH VARIABLE THICKNESS FIRE RING

[75] Inventor: Richard J. Kozerski, Lisle, Ill.

[73] Assignee: Dana Corporation, Toledo, Ohio

[21] Appl. No.: 450,855

[22] Filed: Dec. 20, 1982

[51] Int. Cl.³ .............................................. F16J 15/06
[52] U.S. Cl. .................................. 277/235 B; 277/1;
277/217
[58] Field of Search ............... 277/217, 235 R, 235 A, 277/235 B, 207 R, 1

[56] References Cited

U.S. PATENT DOCUMENTS

| | | | |
|---|---|---|---|
| 1,928,585 | 9/1933 | Balfe | 277/235 B X |
| 2,910,333 | 10/1959 | Koehler | 277/235 R |
| 3,473,813 | 10/1969 | Meyers et al. | 277/235 B X |
| 3,606,361 | 9/1971 | Pohl et al. | 277/235 B |
| 4,121,846 | 10/1978 | Skrycki | 277/235 R |

FOREIGN PATENT DOCUMENTS

| | | | |
|---|---|---|---|
| 1215454 | 4/1966 | Fed. Rep. of Germany | 277/235 B |
| 47-11281 | 8/1972 | Japan | 277/235 B |
| 320057 | 9/1929 | United Kingdom | 277/235 B |

Primary Examiner—Robert S. Ward
Attorney, Agent, or Firm—Frank B. McDonald

[57] ABSTRACT

A cylinder head gasket 10 includes a variable thickness fire ring 12 affixed to a cylinder aperture 8 therein. The ring counteracts the tendency for load distribution in cylinder head areas to vary as a function of bolt spacing and the amount of load or clamping force applied to the cylinder head of an engine. The ring incorporates a thickness gradient determined by desirable unit load around the cylinder head areas. In a preferred embodiment, the ring has a minimum thickness "b" at a point most proximal to a bolt apertures 14, while having a maximum thickness "a" at a point equidistant from two adjacent bolt apertures 14. Also, in a preferred embodiment the variable thickness ring is chemically bonded to the cylinder aperture.

11 Claims, 4 Drawing Figures

CYLINDER HEAD GASKET WITH VARIABLE THICKNESS FIRE RING

BACKGROUND OF THE INVENTION

This invention relates to cylinder head gaskets. More particularly, the invention relates to improvements in fire ring design.

In the art of cylinder head gaskets, numerous practices have been employed for the purpose of achieving effective seals between cylinder heads and engine blocks with respect to combustion gases, lubricants, and cooling fluids circulated therethrough. Generally, clamping forces between the head and block are greater at the regions of the fastening members, typically bolts, than at points or regions away from the fastening members. Thus, there exists a pattern of gradients of seating loads over the gasketed areas, which produce undesirable distortions and strains in the cylinder bore areas.

Many prior art gaskets have utilized some form of compensating element to counteract such load distorting gradients, and to thereby attempt to effect a uniform or constant loading over the gasketed interface between cylinder head and engine block members. One common practice has involved the use of elastomeric sealants, which are utilized to build up areas over the gasket bodies between such bolted regions. However, where such gaskets have involved fire rings attached to boundaries of cylinder apertures, the latter procedures have proved ineffective to adequately compensate for load distortions, particularly where the bolt apertures are in relatively immediate vicinities of metallic fire rings.

SUMMARY OF THE INVENTION

The invention disclosed herein provides a cylinder head gasket with a fire ring having a variable thickness cross section designed to offset or at least to substantially counteract load variations resulting from non-uniform load gradients within the head-block interface. In a preferred embodiment, the fire ring has an axially extending dimension which is variable as a function of its proximity to a given bolt aperture. The latter dimension is preferably a minimum at a point on the ring nearest such aperture. Also in a preferred embodiment, the fire ring is chemically bonded to the boundary of a cylinder aperture in the gasket, and is made of a stainless steel composition.

Alternatively, the ring may be held or maintained at the boundary of the cylinder aperture by means of a mechanical fire ring wrap, which extends about the fire ring and is clamped to the body of the gasket at the boundary of the cylinder aperture. In the latter alternative embodiment, the wrap is preferably of a corrosion resistant metal, and the fire ring is of a mild carbon steel, as no protection from combustion elements is required for the ring in such case.

Finally, the gasket body may also have a variable thickness cross section corresponding to the fire ring proportions.

DETAILED DESCRIPTION OF PREFERRED EMBODIMENTS

Figure 1:
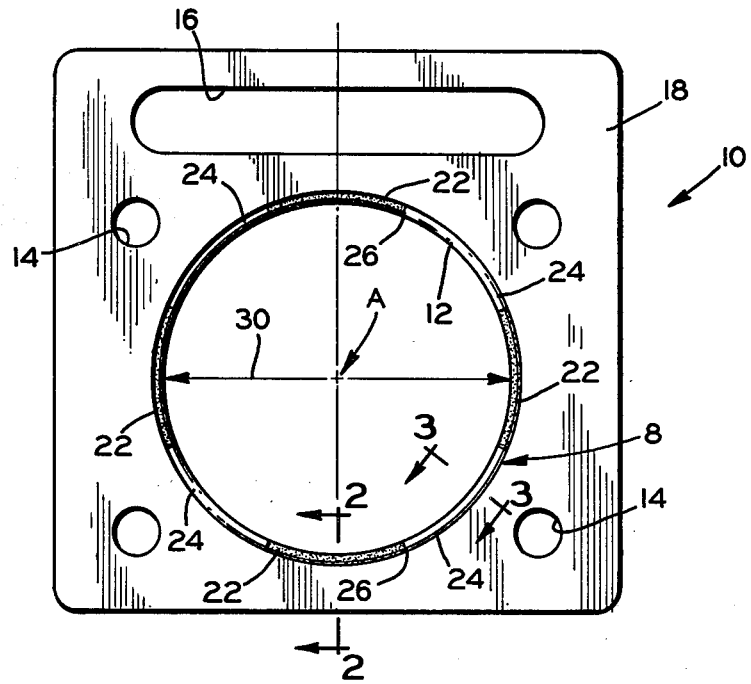
FIG. 1 is a full plan view of a cylinder head gasket of the present invention.

A cylinder head gasket 10 is shown in FIG. 1, the gasket 10 incorporating a fire ring 12 having an axis through point "A", perpendicular to the plane of the gasket body 18. The gasket 10 includes a cylinder bore aperture 8, a plurality of bolt apertures 14, along with a coolant aperture 16.

Figure 2:
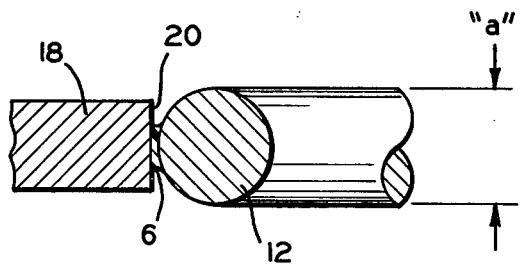
FIG. 2 is a cross sectional view along lines 2—2 of FIG. 1 of the gasket at the fire ring-gasket body interface, at a point interjacent two bolt apertures.
Figure 3:
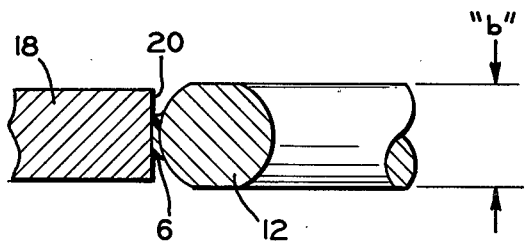
FIG. 3 is a cross sectional view along lines 3—3 of FIG. 1 which shows the same interface at a region of the fire ring closest to a bolt aperture.

Referring also to FIGS. 2 and 3, cross sectional views of the fire ring 12 and gasket body 18 are shown. In the particular embodiment shown, the fire ring 12 is bonded directly to the boundary 20 of the cylinder aperture 8 via chemical bond 6. In accordance with the present invention, an axially extending dimension "a" of the fire ring cross section as shown in FIG. 2 is greater than the axially extending dimension "b" of the fire ring cross section of FIG. 3. As apparent from FIG. 1, the axial dimension "a" is taken at a point equidistant from two adjacent bolt apertures 14, while axial dimension "b" is taken at a point on the ring nearest one particular bolt aperture 14.

The preferred embodiment (as seen in FIG. 1) contains four regions 22 (shaded) of maximum axial dimension, and interjacently of the latter regions, four regions 24 (unshaded) of minimal axial dimension. The respective alternating regions correspond with respective positions of bolt apertures 14 around the cylinder aperture 8. Gradually tapered transition zones 26 are spaced between regions 22 and 24.

Although the preferred embodiment herein provides variation of the axial fire ring dimension solely as a function of bolt aperture spacing, such axial variation can also be a function of cylinder head structural designs, and other parameters.

Figure 4:
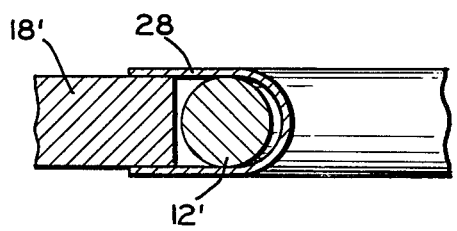
FIG. 4 is a cross sectional view of an alternately preferred embodiment of the fire ring-gasket body interface.

Referring now to FIG. 4, an alternate embodiment is shown which includes a fire ring wrap 28, the wrap 28 providing a structural attachment of a variable thickness fire ring 12' to a gasket body 18'. As will be appreciated by those skilled in the art, the wrap 28 provides an alternative to the chemical bonding attachment means of the fire ring to the gasket body. Thus, the wrap 28 provides for a mechanical securement to the gasket body by an enshrouding of the above-described improved fire ring and a clamping thereof to the gasket body 18' for securement of the ring thereto. In the preferred embodiment, the wrap would not have a variable axial dimension, nor would such be required for operability. The scope of this invention does not exclude a variable thickness wrap, however.

As shown in the embodiment of FIGS. 1, 2 and 3, wherein the fire ring 12 is bonded at 6 directly to the gasket body 18, the fire ring 12 is preferably of a stainless steel wire material, as for example an SAE 30304 stainless steel. In the embodiment of FIG. 4 however, the fire ring 12' may be of a mild, cold rolled carbon steel, to the extent that the wrap 28 in the latter case is preferably made of a corrosion resistant metallic material for direct exposure of the latter to combustion environments. One preferred construction of the improved fire ring of the present invention is a wire ring having an overall diameter 30 of 4.133 inches plus or minus 0.005 inch, wherein the diameter of the wire is 0.072 inch plus or minus 0.001 inch. The axial dimension "a" of the fire ring 12 is in the range of 0.0657 to 0.0669 inch, while the axial dimension "b" is in the range of 0.0655 to 0.0665. Also, in either preferred embodiment, the thickness of the gasket body 18 is in the range of 0.060 to 0.064 inch.

In the preferred embodiment wherein the fire ring 12 is chemically bonded, as shown in FIGS. 2 and 3, the bond 6 is preferably of a thermoset adhesive, as for example a urethane prepolymer in a thixotropic paste. To the extent that the gasket body 18 provides a backup sealing medium and is thus secondary to the combustion gas sealing afforded by the metallic fire ring 12, the thickness of the gasket body may be a constant over the expanse of the body. Alternatively, however, some applications may be better suited to a variation of the gasket body thickness, wherein the thickness would preferably vary directly with the axially extending dimensions "a" and "b" of the fire ring, at least in the immediate area adjacent the ring. This may be afforded by a variation in the thickness of the material of the gasket body 18 per se, or by a build-up on the body of a bondable agent thereto, such as for example an elastomer screened thereon.

A preferred method of making the variable thickness fire ring of the present invention involves first forming a wire ring, the ring having a uniform diameter and a constant or non-varying circular cross section. In a preferred form, the ring is formed of a fully annealed straight wire member, which is formed into a circle, the ends being flash welded to form a completed wire ring. The ring is then placed into a set of male and female die members, which compress the ring to finished dimensions as hereinabove described. The final step is to anneal the resulting product to a fully softened condition, wherein the stresses of compression are relieved. The latter procedure provides for uniform compression of the ring at the maximum thickness regions 22. In a preferred form, the ring will compress uniformly to an average of 0.056 inch plus or minus 0.0015 inch upon being subjected to a compressive load of approximately 91,000 pounds per square inch.

Thus, the improved fire ring 12 has a plurality of thickness regions, by which compression loads are made variable about the cylinder apertures according to bolt aperture proximity. This effects a decrease in the gradients of compression loads realized upon torquing of a cylinder head to an engine block. The result is an improved distribution of forces, particularly in the area of maximum distortions, viz around the bolt aperture areas. The improved fire ring and gasket shown and described, however, provide but a few examples of many variations envisioned under the appended claims.

What is claimed is:

1. In a cylinder head gasket comprising a flat body including at least one cylinder aperture, said aperture having a generally circular boundary, at least one bolt aperture adjacent to said cylinder aperture, and wherein a fire ring is radially affixed to the boundary of said cylinder aperture; an improvement comprising the body of said ring having a cross section, said cross section having an axially extending dimension which is variable as a function of the proximity of said cross section to said one bolt aperture.

2. The improved gasket of claim 1, wherein said axially extending dimension of said cross section is a minimum at a point on said ring nearest said bolt aperture.

3. The improved gasket of claim 2, wherein said fire ring is bonded to said circular boundary of said cylinder aperture.

4. The improved gasket of claim 3 wherein said bond is effected by a structural thermosetting adhesive.

5. The improved gasket of claim 4, wherein said fire ring comprises a stainless steel material.

6. The improved gasket of claim 2, wherein said cylinder aperture comprises a metallic mechanical fire ring wrap, and wherein said wrap is disposed about said fire ring and clamped to said body of said gasket to affix said ring to said boundary of said cylinder aperture.

7. The improved gasket of claim 6, wherein said wrap is of a corrosion-resistant metal.

8. The improved gasket of claim 7, wherein said ring is of a carbon steel material.

9. The improved gasket of claims 5 or 8, wherein said body of said gasket has a cross section which varies directly with said axially extending dimension of said fire ring.

10. The improved gasket of claim 9, further comprising a plurality of said bolt apertures, said plurality positioned about said cylinder aperture, wherein said axially extending dimension of said fire ring is a maximum at a point on said ring equidistant from two adjacent bolt apertures.

11. A cylinder head gasket comprising a flat body having at least one cylinder aperture therein, said aperture having a circular boundary, at least one bolt aperture adjacent to said cylinder aperture, a fire ring radially affixed to said boundary of said cylinder aperture, and said ring having a cross section, said cross section having an axially extending dimension which is variable as a function of the proximity of said cross section to said one bolt aperture.

* * * * *